United States Patent [19]
Ritchie

[11] 3,767,337
[45] Oct. 23, 1973

[54] APPARATUS FOR CURING ENDLESS ELASTOMERIC BELTS

[75] Inventor: George Douglas V. Ritchie, Akron, Ohio

[73] Assignee: The B.F. Goodrich Company, New York, N.Y.

[22] Filed: Nov. 30, 1971

[21] Appl. No.: 203,208

[52] U.S. Cl.............. 425/28 B, 164/277, 264/231
[51] Int. Cl............................................. B29h 5/28
[58] Field of Search.................. 164/277; 425/28 B, 425/28 R, 34 B, 40, 445; 264/345, 347

[56] References Cited
UNITED STATES PATENTS

| | | | |
|---|---|---|---|
| 1,690,887 | 11/1928 | Davis.................................. | 164/277 |
| 2,039,271 | 4/1936 | Bierer................................. | 264/347 |
| 2,303,554 | 12/1942 | Humphreys...................... | 425/817 X |
| 2,522,359 | 9/1950 | Haren............................ | 264/347 X |
| 3,187,379 | 6/1965 | Rahm................................... | 425/224 |

Primary Examiner—R. Spencer Annear
Attorney—R. A. Johnston et al.

[57] ABSTRACT

The belts to be cured are tensioned over the periphery of a drum which is steam heated and rotated in a vertical plane. The drum is partially filled with water to provide a chilled zone in the region where the belts leave the drum upon initiation of drum rotation. A rotatable liquid outlet is clutch-coupled to rotate with the drum for lowering the liquid level at a rate corresponding with the rate of movement of a point fixed on the rotating drum. The drum rotates at a rate such that an uncured portion of belting initially contacting the top of the bottom of the drum is completely cured as it leaves the drum.

7 Claims, 4 Drawing Figures

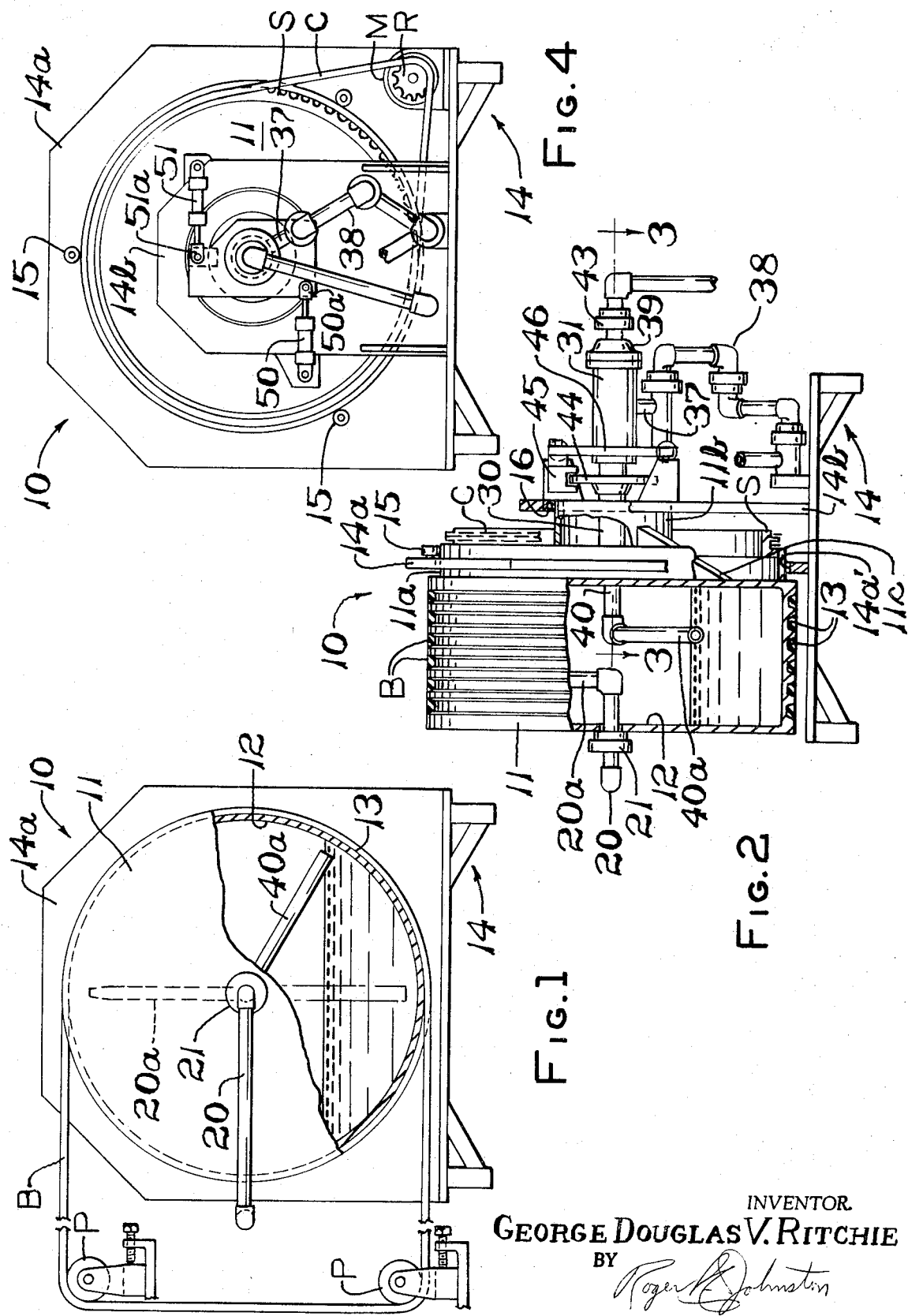

APPARATUS FOR CURING ENDLESS ELASTOMERIC BELTS

BACKGROUND OF THE INVENTION

In the manufacturing of endless elastomeric belts, particularly power transmission belts, it has been found desirable to cure or vulcanize the belts continuously while the belts are tensioned and rotated over a heated drum. Various means have been used for heating the drum, as, for example, electrical resistance coils and filling the drum with steam; however, it has been found more convenient to heat the drum by introducing steam to the interior thereof.

When an uncured elastomeric belt is tensioned over a drum and steam is injected in the drum and the drum allowed to stabilize at curing temperature before being rotated, variation occurs in the state of cure of the portions of the belt initially leaving the drum. This is due to the substantial temperature difference in the portions of the belt adjacent the portions in contact with the heated drum. The drum is usually brought up to curing temperature and rotated at such a rate that the portions initially entering into contact with the drum are in contact with the heated drum a sufficient length of time so as to be completely cured upon leaving the drum surface. The remaining portion of the belt initially tensioned over the drum surface is not completely cured by virtue of paying-off, or leaving, the drum in a time interval insufficient to provide complete cure. When the portions of the belt initially entering into contact with, or feeding onto, the drum leave the drum and reenter the drum after curing of the remaining belt periphery, the portions initially on the drum are in a state of semi-cure and are often over-cured upon reentry on the drum. Thus, it has long been desirable to find a way to control the spanwise temperature gradient along portions of the elastomeric belt initially subjected to less than a full cure cycle by virtue of leaving the drum before complete curing has taken place. More importantly, it has been found that when there is an abrupt transition from a zone of uncured belt at ambient temperature to a zone which has just been subjected to full curing temperature there is a tendency for occurrence of defects in the belt of the type known as blows. It is, therefore, important to avoid such abrupt temperature changing when effecting belt curing in a manner where successive portions of the belt are sequentially subjected to the curing temperature.

SUMMARY OF THE PRESENT INVENTION

The present invention provides a solution to the above-described problem of properly curing endless belts over a rotating heated drum and particularly the portions of each belt initially in contact with the drum and in a position to first pay-off the drum when it is rotated. The apparatus of the present invention includes a hollow drum mounted to rotate in a vertical plane with the periphery adapted to have a plurality of endless belts tensioned thereover. A rotary fitting is provided on the end face of the drum for injecting heated fluid, preferably steam, into the drum. The drum is partially filled with liquid, preferably water, through a second rotary fitting disposed in the opposite face of the drum. A liquid exhausting outlet is provided in the drum which communicates to the interior of the drum concentrically within the rotary steam fitting. The liquid outlet is capable of being rotated at the same angular rate as the drum by activation of a clutching mechanism attached to the outlet. The drum, before commencement of rotation, is initially partially filled with water and steam is injected for heating the region above the liquid. Upon the upper portion of the drum reaching curing temperature, rotation of the drum is begun. As the drum rotates, the clutching mechanism rotates the liquid outlet therewith and lowers the liquid level at a rate corresponding with the rate of movement of a fixed point on the rotating drum coincident with the initial liquid level. The liquid is thus exhausted in a manner which provides reduction of the chilled zone on the periphery of the drum at the same rate as that of the drum rotation. The chilled portion of the drum is adjacent the portion of each belt initially first to leave the drum, which belt portion is not in contact with the drum for a sufficient length of time to be completely cured when drum rotation is begun. Thus, the present invention solves the above-described problem of improper cure by providing a zone of less than full curing temperature along the periphery of the drum, which zone is eliminated in timed relation with drum rotation.

BRIEF DESCRIPTION OF THE DRAWINGS

FIG. 1 is a front elevation view of the apparatus showing the drum, with belts to be cured received thereover, rotatably mounted on a support and the rotary fitting for communicating chilling liquid to the drum. The face of the drum is broken away to illustrate in solid line the liquid outlet in its raised position at onset of drum rotation, and in dashed line in its terminal position with the liquid completely exhausted;

FIG. 2 is a side elevation view of the embodiment of FIG. 1 with portions of the drum broken away to expose the fitting for liquid filling and the rotatable liquid outlet;

FIG. 4 is a rear elevation view of the apparatus with the belts and idlers omitted, showing the arrangement of the clutching mechanism, return actuators, the rotary steam fitting and rotatable liquid exhaust.

DETAILED DESCRIPTION

Figure 3:
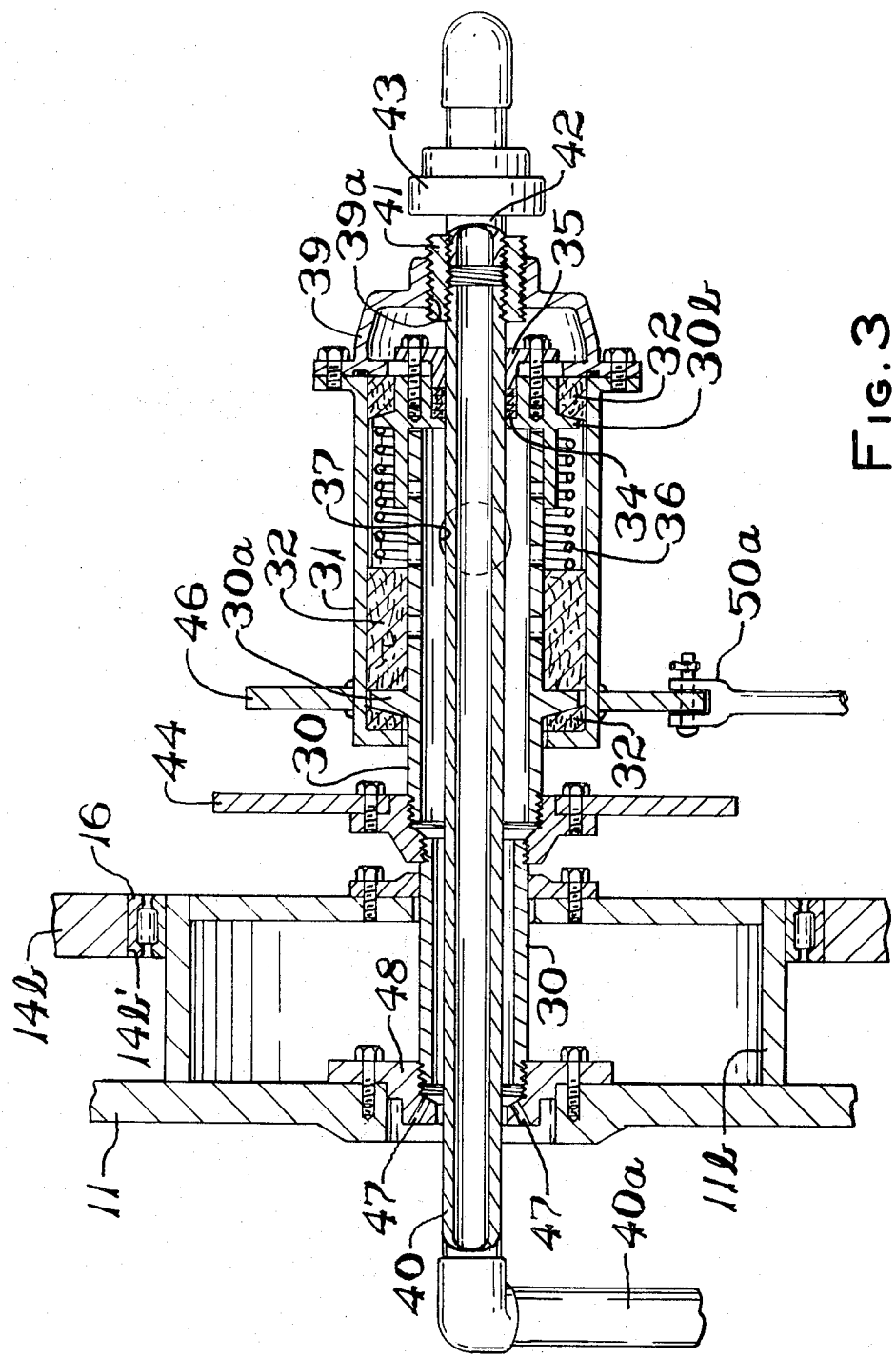
FIG. 3 is a partial section view taken along section indicating lines 3—3 of FIG. 2 and shows the details of the annular steam supply and the liquid outlet positioned concentrically within the steam supply and the position of the clutching disc.

Referring now to FIG. 1, the apparatus 10 has a drum 11 with a hollow chamber 12 formed therein and a plurality of belt-receiving grooves 13 formed circumferentially on the outer periphery thereof. A plurality of belts, B, to be cured are received over the drum in grooves 13 and tensioned thereover by any mechanical expedient, as, for example, adjustable idler pulleys, P. The drum is supported on a frame 14 in a manner permitting rotation of the drum in a vertical plane.

Referring now to FIGS. 2, 3 and 4, the drum 11 is shown in the preferred form of the invention mounted with its axis extending horizontally in cantilever from a pair of spaced parallel vertical plates 14a, 14b attached to frame 14. The drum has a rim 11a received axially through an aperture 14a' in the first vertical plate 14a with the rim 11a mounted in bearings 15 disposed about the aperture 14a'. The drum further has a ring 11b co-axially attached thereto in axially spaced arrangement by at least three radially disposed plates 11c to which the ring is rigidly attached. A second bearing 16 is provided in an aperture 14b' formed in the second plate 14b with the ring 11b received therethrough, thus providing a radially rigid rotational mounting for the drum. A chain sprocket, S, is provided on the drum co-axially therewith and a roller chain C is received thereover interconnecting the sprocket S with a sprocket R provided on a driving motor M attached to frame 14.

Referring to FIG. 1 and FIG. 2, a liquid inlet pipe 20 is provided along the drum axis through the end-face of the drum opposite vertical plates 14a,14b. The pipe 20 communicates with the interior of the drum through a rotary seal 21 which permits the drum to rotate over the pipe and yet maintains fluid pressure integrity in the drum. The pipe 20 has a vertically disposed spray bar 20a for spraying cooling liquid on the inner periphery of the drum at the top of the drum. The pipe 20 is fixed with respect to the frame 14 (see FIG. 1) and thus the spray bar 20a is maintained in a fixed position with respect to the support means and does not rotate with the drum. A liquid supply means (not illustrated) is connected to the pipe 20 to supply cooling liquid under pressure to the interior of the drum.

Referring now to FIGS. 2, 3 and 4, a fluid inlet pipe 30 is provided co-axially through the center of the bearings and has the rotary steam fitting 31 connected thereto for supplying steam under pressure to heat the drum. The rotary fitting is disposed annularly about the pipe 30 and has annular rotary seals 32 therein of carbon material disposed concentrically and radially intermediate the fitting 31 and the pipe 30.

The carbon seals 32 are wedged axially against both axial faces of conical flanges 30a,30b provided on the outer periphery of the portion of the pipe 30 received in the fitting 31. One conical flange 30a is preferably formed integral with the pipe 30 and the second flange 30b is free to slide along the pipe, but a fluid-tight seal is formed therebetween by compressible packing glands 34 compressed axially by a retaining collar 35 bolted to the conical flange 30b. A spring 36 is disposed concentrically about pipe 30 axially intermediate the flanges 30a,30b for urging the carbon seals 32 axially away from each other and into contact with the conical flanges for effecting rotary sealing of the steam about the outer periphery of pipe 30. The rotary steam fitting 31 has an inlet port 37 through the wall thereof to which is attached an articulated pipe linkage 38. The pipe linkage 38 is preferably formed of at least two sections of pipe interconnected by rotary steam fittings to permit the pipe linkage 38 to remain connected to the inlet port 37 when the fitting 31 is rotated. A cover 39 is fastened over the end of the rotary fitting 31 opposite the drum, the cover having a sealing gasket or similar seal ring provided in between the adjacent surfaces of the cap 39 and fitting 31. The end cap 39 has a central opening 39a in the end thereof which opening has a coupling 41 received therein in a fluid-tight manner, the coupling having tapered pipe threads in both ends for attachment of a pipe fitting 42. A fluid source, preferably a steam supply (not illustrated), is provided and is connected to pipe 38 for supplying steam under pressure to the chamber within the drum.

A fluid outlet pipe 40 is disposed concentrically within the steam pipe 30 and the inlet end 40a of the pipe 40 extends into the drum and radially downward toward the inner periphery of the drum. The outlet pipe extends continuously axially through the steam pipe 30 and threads into interior end of the coupling 41 in the end cap 39 of the rotary steam fitting 31. A nipple 42 is threaded into the exterior end of the coupling 41 and the nipple is attached to a rotary pipe fitting 43 for communicating condensate and chill liquid from the rotating drum 11. If desired, a catch basin (not illustrated) may be provided for recirculating the condensate and chill water from exhaust pipe 40 to the cooling liquid supply source. In operation, as the drum rotates the steam pipe 30, flanges 30a and 30b rotate in the carbon sleeve seals while the fitting 31 and exhaust pipe 40 are maintained rotationally fixed with respect to the support frame 14.

A disc 44 is disposed intermediate the rotary fitting 31 and the bearing ring 11b of the drum annularly over the steam pipe 30 and rotates with the drum and steam pipe 30 at right angles to the drum axis.

Referring now to FIG. 2, a clutching mechanism, preferably a caliper brake 45, is mounted on the rotary fitting 31 by attachment to an intermediate plate 46 rigidly attached to the rotary fitting 31 and extending radially outwardly therefrom. The caliper brake is received over the outer periphery of a disc 44 and is thereby positioned to serve as a clutch. Upon activation of the caliper brake against the disc 44, rotary fitting 31 is locked to the disc 44 so that the fitting 31 rotates with the disc 44, and consequently with the drum and pipe 30, to which the disc is attached. As the fitting 31 rotates with brake 45 actuated, the liquid outlet pipe 40 is caused to rotate, at the same rate as the drum, from the initial position shown in solid line in FIG. 1. When the pipe 40 has been rotated to the position shown in dashed outline in FIG. 1, the caliper brake 45 is released and the fitting 31 and pipe 40 remain stationary. The liquid level is thus lowered at a rate corresponding to the rate of movement of a fixed point on the rotating drum by the inlet 40a of exhaust pipe 40 being lowered accordingly. When the inlet to the liquid outlet pipe 40 is positioned vertically downward, the clutch is disengaged and the disc permitted to rotate without rotating the fitting 31.

A pair of actuators 50 and 51 are mounted on the vertical plate 14b and are each connected respectively in diametrically opposite relationship to the intermediate plate 46 on the rotary fitting 31 by clevis connections 50a and 51a, respectively. The actuators are so arranged that upon activation, the steam fitting 31, and outlet pipe 40 are rotated in a direction opposite to the direction of drum rotation to reposition the inlet 40a of outlet pipe 40 to its initial position as will be further explained below.

In preparation for curing, the belts to be cured are placed over the drum periphery and tensioned thereover by the adjustable idler pulleys P. In operation, steam is introduced through the articulated pipe 38, which communicates with the interior of the rotary fitting 31, disposed annularly about the fluid outlet pipe 40, then through pipe 30 and into the drum through radial passages 47 formed in a central fitting 48 on the drum to which pipe 30 is attached. Chilling liquid is introduced prior to the introduction of the steam through conduit 20 and rotary fitting 21, and the liquid passes through spray bar 20a to the interior of the drum until the liquid level reaches the inlet end 40a of the outlet tube 40. Then, steam is introduced through fitting 31 and steam pressure forces excess liquid out through the tube 40 and through the rotary fitting 43, thus maintaining a constant fluid level in the drum. In the preferred practice of the invention, the belts are wrapped 180° about the drum; and, for this arrangement of the belts, the liquid outlet tube, or pipe 40, is initially positioned within the drum so as to subtend a central angle, measured from the drum axis, of 30° below the horizontal, such that rotation of the pipe 40 with the drum will lower the inlet end 40a of the pipe 40. When the region in the drum above the liquid level reaches desired curing temperature, the drum is rotated at the desired rate for curing the belt. Simultaneously, the clutch 45 is energized to rotate the fluid outlet 40 from its initial position shown in solid line in FIG. 1 to the position shown in dashed line in FIG. 1. As the liquid outlet tube 40 is rotated downward at the same rate of rotation as the drum periphery, the liquid level is lowered at a rate corresponding with the rate of movement of a fixed point on the periphery of the rotating drum. Thus, the portion of the belt initially in contact with the drum in the region chilled by the liquid is maintained in contact with that region as the liquid level is lowering while the drum rotates. This permits the portion of the drum adjacent the region of the belts initially first paying off the drum as the drum is rotated to acquire a temperature intermediate that of the cured and uncured portions of the belts since the liquid in the drum will take up heat from the steam thereabove during the lowering of the liquid level. The portions of the belts extending in contact with the steam heated portion of the drum have a progressively increasing, or graduated, state of cure with full cure being effected in all portions which have been in contact with 180° of the periphery of the steam heated portion of the drum. This cooled zone prevents blowing of the belts while the cure gradient on a portion of each belt eliminates overcuring such portions upon their reentry at the top of the drum during continued drum rotation.

Upon completion of curing cycle and removal of the belts, the actuators 50 and 51 are activated to rotate the fitting 31 and pipe 40 to bring pipe 40 to its original position. The fluid inlet end 40a at the end of pipe 40 within the drum is thus rotated back to its initial position to permit partial refilling of the drum with liquid for the next curing cycle.

The present invention thus provides for the continuous curing of endless elastomeric belts about a heated rotated drum. Upon initially heating the drum, a portion of the belt first to leave the drum is prevented from blowing by partial liquid filling of the drum to provide a spanwise temperature gradient, or transition zone, for the portions of the belt initially in contact with the drum for a length of time insufficient to attain complete curing. The chilling liquid is exhausted from the drum in a manner such that the liquid level is lowered at a rate corresponding with the rate of movement of a fixed point on the rotating drum. Exhausting the chilling liquid in this manner maintains the spanwise temperature gradient during the initial portions of the curing cycle.

Variations of the present invention will be apparent to those having ordinary skill in the art and the invention is limited only by the spirit and scope of the following claims.

I claim:

1. Apparatus for curing endless elastomeric belts comprising:

a. a drum having a hollow chamber therein and having the outer periphery adapted to receive thereover a plurality of endless belts to be cured;
b. support means having said drum mounted thereon in a manner permitting rotation of said drum about a horizontal axis;
c. first port means communicating with the said chamber and including first fluid conducting means rotatably connected thereto for conducting a heated fluid to said chamber while said drum is rotating;
d. fluid source means operably connected to said first fluid conducting means for supplying heated fluid under pressure to said drum;
e. second port means communicating with said chamber and including liquid conducting means rotatably connected thereto for conducting cooling liquid to said chamber;
f. liquid source means operably connected to said liquid conducting means;
g. exhaust port means communicating with said chamber and including conduit means having the inlet thereof extending into said drum and movably connected to said exhaust port means;
h. actuator means operably connected to said conduit means, which actuator means is capable of raising and lowering the inlet of said conduit means relative to said support means for controlling the liquid level while said drum is rotating; and,
i. means for tensioning the belts to be cured over the periphery of said drum;
j. means operably connected to said drum for rotating same about said horizontal axis.

2. The apparatus defined in claim 1, wherein
a. said first port means is located on the axis of said drum on one end face thereof;
b. said first port means annularly surrounds said exhaust port means and said heated liquid conducting means annularly surrounds said conduit means;
c. said second port means is positioned centrally of said drum on the end face opposite said first port means; and,
d. said conduit means is rotatably connected to said first port means and extends through said exhaust port means into said drum and radially outwardly from the drum axis having the inlet end thereof spaced closely adjacent the inner periphery of said drum.

3. The apparatus defined in claim 1, wherein said actuator means includes:
a. a disc rotating concentrically with said drum and clutch means mounted on said conduit means means such that upon engagement of said clutch means, the inlet of said movable conduit means is caused to rotate coincident with a fixed point on the rotating drum and downward with respect to said support means for lowering the liquid level in said drum;
b. power means mounted on said support means and operatively connected to said clutch means so as to move the inlet end of said movable conduit means upward with respect to said support means for raising the liquid level in said drum.

4. The apparatus defined in claim 1, wherein said liquid conducting means extends into said drum and includes means fixed with respect to said support means for spraying the cooling liquid on the inner periphery of said drum while said drum is rotating.

5. In an apparatus for continuously curing endless elastomeric belts including a hollow drum supported for rotation about a horizontal axis with separate steam and liquid inlet means communicating with the interior of the drum, the improvement comprising:
   a. liquid exhaust conduit means extending axially into said drum with an inlet portion on said conduit means disposed generally radially within the interior of said drum; and
   b. actuator means separately connected to said conduit means which actuator means is selectively operable to raise and lower the inlet of said conduit means while the drum is rotating for controlling the liquid level in the drum.

6. The apparatus defined in claim 5, wherein said actuator means includes:
   a. a disc rotating concentrically with said drum and clutch means mounted on said liquid exhaust conduit means such that upon engagement of said clutch means, the inlet portion of said conduit means is caused to rotate coincident with a fixed point on the rotating drum downwardly for lowering the liquid level in said drum; and
   b. power means operatively connected to said clutch means to move the inlet portion of said conduit means upwardly to permit raising the liquid level in said drum.

7. The apparatus defined in claim 5, wherein said liquid inlet means extends into said drum and includes means for spraying cooling liquid on the inner periphery of said drum while said drum is rotating.

* * * * *